United States Patent
Ayub

(10) Patent No.: US 10,627,141 B2
(45) Date of Patent: Apr. 21, 2020

(54) SMART ACCUMULATOR TO SCRUB INLET FLUID

(71) Applicant: Shawket Bin Ayub, Plano, TX (US)

(72) Inventor: Shawket Bin Ayub, Plano, TX (US)

(*) Notice: Subject to any disclaimer, the term of this patent is extended or adjusted under 35 U.S.C. 154(b) by 178 days.

(21) Appl. No.: 15/935,012

(22) Filed: Mar. 25, 2018

(65) Prior Publication Data

US 2019/0293328 A1    Sep. 26, 2019

(51) Int. Cl.
| | |
|---|---|
| F25B 43/00 | (2006.01) |
| B01D 53/26 | (2006.01) |
| B01D 46/00 | (2006.01) |
| B01D 46/44 | (2006.01) |
| B01D 46/42 | (2006.01) |
| B01D 46/24 | (2006.01) |
| B01D 39/20 | (2006.01) |

(52) U.S. Cl.
CPC ........ F25B 43/006 (2013.01); B01D 39/2017 (2013.01); B01D 46/0024 (2013.01); B01D 46/0031 (2013.01); B01D 46/0036 (2013.01); B01D 46/0087 (2013.01); B01D 46/2403 (2013.01); B01D 46/4263 (2013.01); B01D 46/444 (2013.01); B01D 53/261 (2013.01); F25B 43/003 (2013.01); *B01D 2267/40* (2013.01); *B01D 2271/02* (2013.01); *F25B 2400/01* (2013.01); *F25B 2500/28* (2013.01)

(58) Field of Classification Search
CPC .................................................... F25B 43/006
USPC .................... 62/184; 95/120–124; 96/110
See application file for complete search history.

(56) References Cited

U.S. PATENT DOCUMENTS

| | | | | |
|---|---|---|---|---|
| 4,354,362 A * | 10/1982 | Schumacher | .......... | B01D 15/00 210/DIG. 6 |
| 4,938,037 A * | 7/1990 | Carlisle, Jr. | ........... | F25B 43/006 137/590 |
| 5,201,792 A * | 4/1993 | Study | ................... | B01D 53/261 210/282 |
| 5,651,266 A * | 7/1997 | Hutchison | ............ | B01D 53/261 29/890.06 |
| 5,806,330 A * | 9/1998 | Falkowski | ............ | F25B 43/006 62/184 |
| 10,190,809 B2 * | 1/2019 | Hosokawa | ............ | F25B 43/006 |
| 10,215,461 B2 * | 2/2019 | Hosokawa | .............. | F25B 43/00 |
| 2005/0198993 A1* | 9/2005 | Corrigan | ............ | B01D 53/0415 62/474 |
| 2005/0235614 A1* | 10/2005 | Smith | .................. | B01D 46/003 55/309 |
| 2006/0053832 A1* | 3/2006 | Ballet | ..................... | F25B 13/00 62/503 |

(Continued)

*Primary Examiner* — Nina Bhat

(57) ABSTRACT

The Smart Accumulator Fluid Scrubbing System includes a drying mechanism and filtration system with liquid level control all in one housing to protect compressors or compressor systems from moisture, contaminants, and liquid ingestion. The Smart Accumulator is connected to the compressor or compressor systems inlet. The Smart Accumulator only allow dry, clean gas to enter the compressor and compressor system. The switch in conjunction with the heating elements and compressor circuits prevents the compressor from running, while heating elements boil off excess liquid. The Pressure equalizing port prevent compressor to start at high delta pressure and or reduces extremely high-pressure compressor or system operation that may be detrimental to mechanical failure.

8 Claims, 1 Drawing Sheet

Smart Accumulator

(56) References Cited

U.S. PATENT DOCUMENTS

| | | | |
|---|---|---|---|
| 2007/0231160 A1* | 10/2007 | Chan | B01D 53/261 417/244 |
| 2010/0236283 A1* | 9/2010 | Ballet | F25B 13/00 62/513 |
| 2013/0036912 A1* | 2/2013 | Clair | B01D 53/0415 96/118 |

* cited by examiner

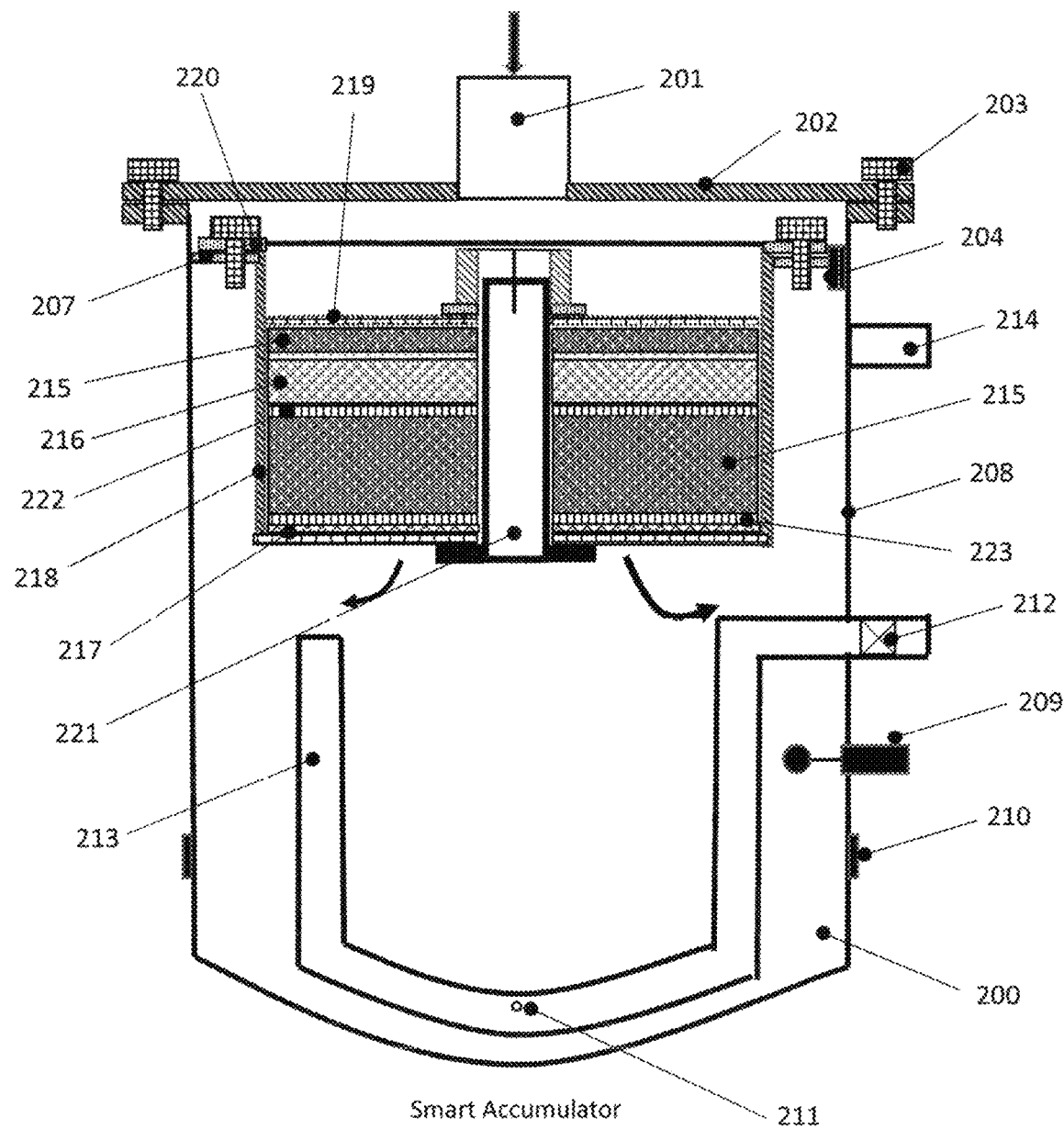
Smart Accumulator

US 10,627,141 B2

SMART ACCUMULATOR TO SCRUB INLET FLUID

BACKGROUND

Field of Invention

The present invention relates generally to methods of preventing contaminants, moisture, and liquid from entering a compressor, compression system, or any mechanical system that requires clean gas. This is done by scrubbing the inlet fluid from moisture, contaminants, and liquid, which can cause serious damage to the parts.

History of the Related Art

A common failure mode of compressors or compression systems is from contaminants, moisture, or liquid refrigerant entering the compressor and the system.

Currently, separate filter driers are used to filter the contaminants and moisture. A separate accumulator is also connected in series to remove small amounts of liquid refrigerant. Often, a separate receiver tank is also connected in series to hold additional liquid in case the accumulator is not large enough. This arrangement is expensive, complex, and still does not guarantee prevention of moisture, contaminant, or liquid from entering the compression systems.

The Smart Accumulator is designed by considering all failure modes. It is designed to remove moisture, filter out contaminants, and manage liquids such that no liquid can enter the compressor or compression system that require clean gas.

SUMMARY

In one aspect the present invention relates to the Smart Accumulator with Centralized Replicable Filtration system, which removes moistures, filters contaminants, and prevents liquid from entering the compressor or compressor housing.

In another aspect the Smart Accumulator is equipped with a filter drier assembly and a liquid trigger switch connected to the electrical circuit to turn the heating elements ON and turn OFF the compressor when the liquid level rises above the set level. The heating elements boils off excess liquid to safety levels, which triggers the switch off and reenables the compressor.

The Filter Assembly contains the filter drier and strainer mesh. This assembly is attached to the Holder. The Cap is threaded or welded to the Smart Accumulator housing.

The Filter Assembly can be replaced when it becomes dirty.

The Smart Accumulator additionally prevents liquid entering the compressor by isolating the Intake Tube inlet port high enough to the Threaded Cap.

The Inlet Tube has a spring-loaded Check Valve, which prevents refrigerant back flow.

The Inlet Tube has a bypass Safety Flap which opens if the Filter Assembly is clogged.

The Intake Tube has a check valve, restricting back flow from the Compressor Housing, in the event of servicing or compressor failure.

BRIEF DESCRIPTION OF THE DRAWINGS

For a more complete understanding of the present invention and for further illustration of the design and advantages thereof, refer to the drawing in FIG. 1.

DETAILED DESCRIPTION

Various components of the present invention will now be described more fully with reference to the accompanied drawings. The invention may, however, be embodied in many different forms and should not be constrained to the embodiment set forth herein.

FIG. 1 illustrates a Smart Accumulator 200. In a typical system, the Smart Accumulator will be attached directly to the compressor housing by means of tubing or can be placed in the suction line.

The Smart Accumulator 200 uses a heat conductive Housing 208 that is exposed to the ambient heat to assist evaporation of any refrigerant or volatile liquid.

The Smart Accumulator uses heating Elements 210 attached to Housing 208. A Switch 209 is attached to the Housing 208. The Switch 209 triggers ON when the liquid level inside the Housing 208 increases above the set limit. The heating Elements 209 heats the liquid to evaporate.

The inside of the Housing 208 has Brackets 207 which holds the Holder 221 of the Filter Assembly 218.

The Housing 208 connects to port 214 to connect to high pressure chamber to Equalization or release high pressure when needed. The Pressure Equalizing port 214 can be connected with some valving to fluidly exchange flow from high to low pressure when needed, for compressors that cannot start at High to Low delta pressure or to lower compressor or system very high discharge pressure.

The Housing 208 connects to an Intake Tube 213 with inlet port in close proximity to the top of the Top Cover 202 to ensure that only clean gas can enter the compressor and compressor system.

The Intake Tube 213 is attached to a Valve 212 to prevent back flow in the event of compressor failure or during servicing the Smart Accumulator 200.

The Intake Tube 213 provides a small Oil Hole 211 for oil to return to the compressor and compressor housing.

The Inlet Tube 201 has Safety Flap 204, which opens only on positive set pressure by design. The Safety Flap 204 opens only when the Filter Assembly 218 is clogged which increases the positive pressure.

The Filter Assembly 218 consists of Desiccant 216 which resides between the Perforated Partition 219 and 222 to remove moisture from the gas entering to Inlet Tube 201.

The Filter Assembly 218 consists of filter material 215 which resides between the Perforated Partition 222 and 223 to remove contaminants from the gas entering from the Desiccant 216 assembly.

The Filter Assembly 218 consists of Strainer Mesh 217 which further removes particles from the gas entering from the filter material 215 assembly. The Strainer Mesh 217 size depends on the minimum size of contaminants that are required to be filtered.

The Sealing Plate 220 seals against the bracket 207 of the Filter Assembly 218.

The Top Cover 202 is welded and screwed to housing 208 and to the Inlet Tube 201.

The inlet Tube 201 is welded to top cover 202.

The Funnel (205) is in operative connection with the filter.

The invention claimed is:

1. A Smart accumulator fluid scrubbing device for preventing moisture or liquid or contaminants in a gaseous fluid from entering a compressor said Smart Accumulator in fluid connection with said compressor and wherein said Smart Accumulator comprises a housing comprising a top cover; and inlet tube connected to said housing; disposed within said housing is a programmable electronic controller in operative connection with a power supply; heating elements for evaporating any liquid present in the accumulator; an intake tube in operative connection with said top cover of said Smart Accumulator for preventing back flow; fluidly connected to said inlet tube is a safety flap which is in operative connection with a filter assembly, said filter assembly comprising a desiccant disposed between a perforated partition plate and filter material being stacked vertically within said housing for scrubbing and removing fluids or contaminants.

2. The Smart Accumulator as claimed in claim 1, wherein the filter assembly further comprises two mesh strainers wherein said desiccant is disposed vertically between said mesh strainers for removing particulate and moisture from said fluid entering the Smart Accumulator.

3. The Smart Accumulator of claim 1, wherein a sensor is disposed within said housing in operative connection with said programmable controller for liquid moisture sensing to control the heating elements within said Smart Accumulator.

4. The Smart Accumulator of claim 1, further including a bleed port valving for controlling the pressure of the gases prior to entry into a compressor.

5. The Smart Accumulator of claim 1, wherein said intake tube is in operative connection with a check valve wherein said check valve is closed for preventing back flow and for servicing the Smart Accumulator.

6. A Smart accumulator fluid scrubbing device for preventing moisture or liquid or contaminants in a gaseous fluid from entering a compressor said Smart Accumulator in fluid connection with said compressor and wherein said Smart Accumulator comprises a housing comprising a top cover; and inlet tube connected to said housing; disposed within said housing is a programmable electronic controller in operative connection with a power supply; heating elements for evaporating any liquid present in the accumulator; an intake tube in operative connection with said top cover of said Smart Accumulator for preventing back flow; a cap which is operative connection with said Smart Accumulator housing, and wherein said filter assembly contains a filter dried and strainer mesh which in fluid connection with said cap.

7. The Smart Accumulator of claim 6, wherein said filter assembly is serviceable and replaceable.

8. The smart accumulator of claim 6, wherein said cap attachment to the housing is welded or threaded.

* * * * *